(12) United States Patent
Dodge (10) Patent No.: US 7,525,264 B2
(45) Date of Patent: Apr. 28, 2009

(54) SHUNT REGULATION APPARATUS, SYSTEMS, AND METHODS

(75) Inventor: Carl Dodge, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 59 days.

(21) Appl. No.: 11/189,460

(22) Filed: Jul. 26, 2005

(65) Prior Publication Data

US 2007/0024217 A1 Feb. 1, 2007

(51) Int. Cl.
*H02P 1/54* (2006.01)

(52) U.S. Cl. .................... 318/108; 318/17; 318/780; 318/811; 376/111; 340/853.3; 340/854.9; 340/855.4

(58) Field of Classification Search ............ 318/811, 318/780, 17, 138, 500, 767, 813; 417/18, 417/45; 323/361; 340/854.9, 855.4, 853.3
See application file for complete search history.

(56) References Cited

U.S. PATENT DOCUMENTS

| | | | | |
|---|---|---|---|---|
| 3,924,138 A | * | 12/1975 | Hopkinson | 376/111 |
| 3,947,725 A | * | 3/1976 | Lucas | 361/17 |
| 3,982,431 A | * | 9/1976 | Grosso et al. | 73/152.47 |
| 4,013,945 A | * | 3/1977 | Grosso | 324/207.25 |
| 4,021,774 A | * | 5/1977 | Asmundsson et al. | 340/853.8 |
| 4,136,327 A | * | 1/1979 | Flanders et al. | 340/854.3 |
| 4,284,979 A | * | 8/1981 | Flanders et al. | 340/825.53 |
| 4,330,740 A | * | 5/1982 | Shell et al. | 318/780 |
| 4,370,098 A | * | 1/1983 | McClain et al. | 417/18 |
| 4,620,189 A | * | 10/1986 | Farque | 340/855.3 |
| 4,720,996 A | | 1/1988 | Marsden et al. | |
| 4,748,341 A | * | 5/1988 | Gupta | 307/64 |
| 4,788,545 A | * | 11/1988 | Farque | 340/854.9 |
| 4,876,539 A | * | 10/1989 | Farque | 340/855.9 |
| 5,005,100 A | * | 4/1991 | Owen | |
| 5,130,616 A | * | 7/1992 | Owen | 318/17 |
| 5,198,734 A | * | 3/1993 | Johnson | |
| 5,216,356 A | * | 6/1993 | Owen | 323/361 |
| 5,449,991 A | * | 9/1995 | Owen | 318/500 |
| 5,844,397 A | * | 12/1998 | Konecny et al. | 318/811 |
| 5,909,098 A | * | 6/1999 | Konecny et al. | 318/811 |

(Continued)

FOREIGN PATENT DOCUMENTS

EP 0598557 A1 5/1994

(Continued)

OTHER PUBLICATIONS

Frankel, Sidney, "Quasi-TEM Line Theory", *Multiconductor transmission line analysis*, Dedham, Mass.: Artech House, Chapter 7, (1977), 175-210.

(Continued)

*Primary Examiner*—Paul Ip
(74) *Attorney, Agent, or Firm*—Schwegman, Lundberg & Woessner, P.A.

(57) ABSTRACT

In some embodiments, an apparatus and a system, as well as a method and an article, may include receiving shunt current in one or more conductors according to a sensed component of power distributed by the conductors through one or more transformers coupled to the conductors and determined by an inductance associated with the transformers and a capacitance associated with the conductors.

34 Claims, 4 Drawing Sheets

U.S. PATENT DOCUMENTS

| | | | |
|---|---|---|---|
| 6,348,876 B1* | 2/2002 | Wei et al. | |
| 6,420,842 B1* | 7/2002 | Gold | |
| 6,469,636 B1* | 10/2002 | Baird et al. | 340/854.9 |
| 6,518,733 B1* | 2/2003 | Schenkel et al. | |
| 6,747,569 B2* | 6/2004 | Hill et al. | |
| 6,898,149 B2* | 5/2005 | Hill et al. | |
| 6,914,538 B2* | 7/2005 | Baird et al. | 340/854.9 |
| 6,937,159 B2* | 8/2005 | Hill et al. | |
| 7,081,831 B2* | 7/2006 | Dodge | 340/855.4 |
| 7,154,412 B2* | 12/2006 | Dodge et al. | |
| 2002/0163441 A1* | 11/2002 | Hill et al. | |
| 2003/0010492 A1* | 1/2003 | Hill et al. | |
| 2003/0010493 A1* | 1/2003 | Hill et al. | |
| 2003/0085816 A1* | 5/2003 | Baird et al. | 340/854.9 |
| 2003/0090240 A1* | 5/2003 | Schenkel et al. | |
| 2003/0214820 A1* | 11/2003 | Nakata | |
| 2004/0100740 A1* | 5/2004 | Iwashita | |
| 2004/0113790 A1* | 6/2004 | Hamel et al. | |
| 2004/0130299 A1* | 7/2004 | Pietkiewicz et al. | |
| 2004/0257832 A1* | 12/2004 | Skeist et al. | |
| 2005/0012487 A1* | 1/2005 | Skeist et al. | |
| 2005/0029476 A1* | 2/2005 | Biester et al. | |
| 2005/0046585 A1* | 3/2005 | Dodge | 340/853.3 |

FOREIGN PATENT DOCUMENTS

| | | |
|---|---|---|
| GB | 1123799 | 8/1968 |

OTHER PUBLICATIONS

Paul, Clayton R., "Frequency-Domain Analysis", *Analysis of multiconductor transmission lines*, New York : Wiley, Chapter 4, (1994), 186-246.

Strawe, David F., "Analysis of the Controlled-Lay Conductor", *Boeing Co. report No. D2-26245-1*, (Jan. 1973), 1-36.

Strawe, David F., "Analysis of Uniform Symmetric Transmission Lines", *Boeing Co. report No. D2-19734-1*, (Jan. 27, 1971), 1-29.

International Search Report and Written Opinion mailed Jan. 15, 2007 in PCT/US2006/009823 (WO 2007/018613); European Patent Office; 11 pages.

"PCT Application No. PCT/US2006/009823, International Search Report mailed Jan. 15, 2008", 4 pgs.

"PCT Application No. PCT/US2006/009823, Written Opinion mailed Jan. 15, 2008", 7 pgs.

\* cited by examiner

SHUNT REGULATION APPARATUS, SYSTEMS, AND METHODS

TECHNICAL FIELD

Various embodiments described herein relate to electrical power management generally, including apparatus, systems, and methods for regulating current and voltage.

BACKGROUND INFORMATION

Motors can be used in boreholes to carry out many tasks, including operating hydraulic motors, rotating coring tool hole cutting saws, and opening/closing caliper arms. When powered near the end of a long cable, the voltage drop across the wires carrying current to the motor can be significant, since motors may use current in proportion to the mechanical loads they support. Thus, abruptly changing mechanical loads may result in correspondingly abrupt changes in supply voltage, both to the motor, and to instrumentation powered by, or derived from, the same supply.

Generally, shunt regulators may be used to help regulate downhole supply voltages as motor loads change. However, such shunt regulators may operate to cause unwanted heating near the area in the downhole tool where shunting occurs.

DETAILED DESCRIPTION

In some embodiments, a shunt voltage regulator apparatus is disclosed that can dissipate excess power into conductors connected to a load, such as a motor connected to the conductors including in a logging line cable. For example, if a cable including one or more conductors can dissipate 0.5 watts per meter, and the cable is 4000 meters long, then approximately 2000 watts may be dissipated along the cable length. In many circumstances, this constitutes a significant amount of power, and in fact, it is anticipated that even greater amounts of power may be dealt with in the same fashion.

In order to direct unwanted current into selected conductors, the current not needed by the electrical load (e.g., a motor when suddenly relieved of a mechanical load) can be shunted through the primary winding of a mode transformer. Thus, one or more mode transformers can be connected to transfer the shunted current so as to circulate in selected conductors, such as downhole logging line cable conductors. The heat dissipated in the conductors may then be the sum of the heat due to the currents acting to transmit power downhole and the currents created by the electrical load below using some portion of the logging line cable as a shunt circuit to absorb power.

Figure 1:
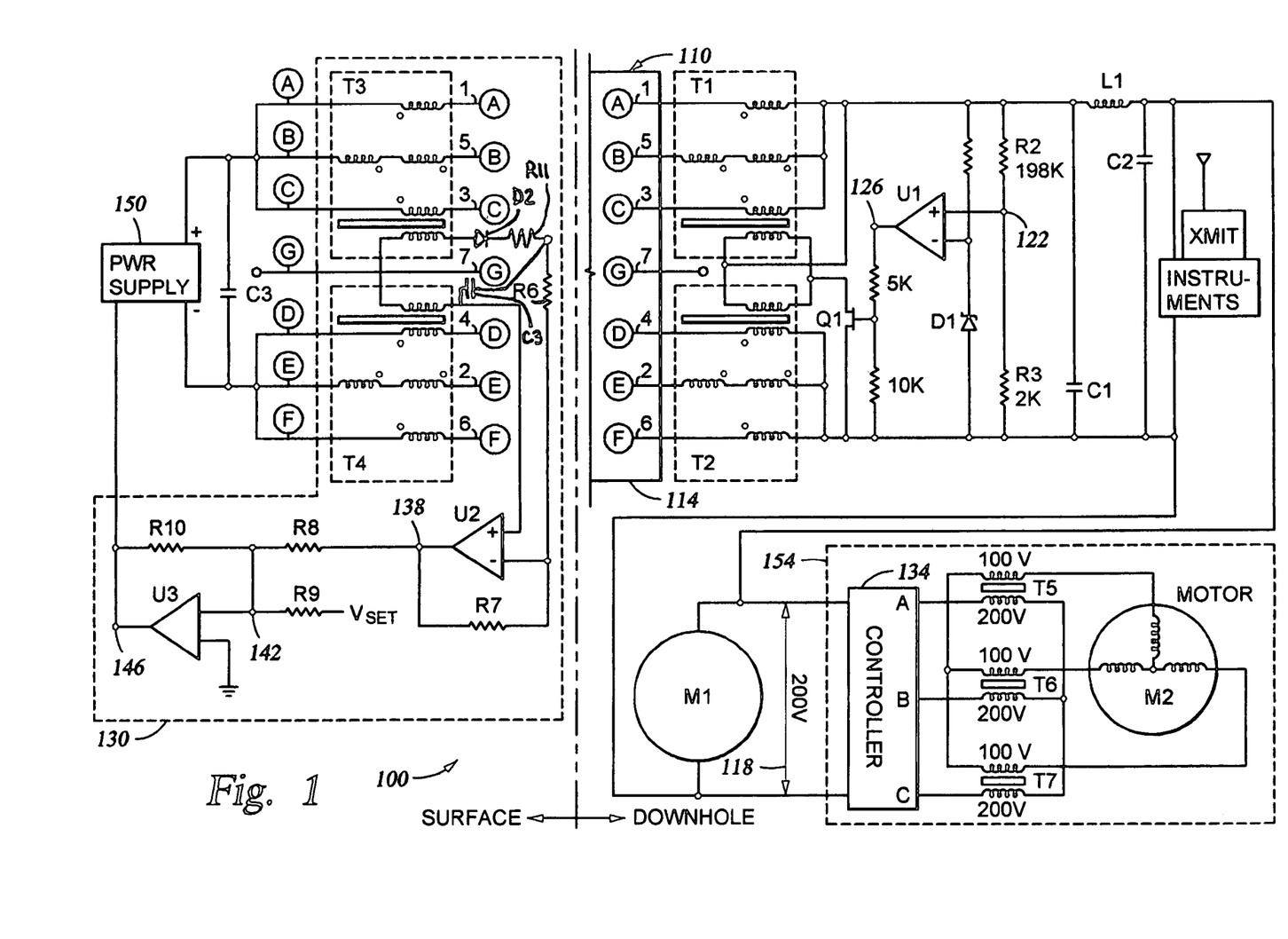
FIG. 1 is a schematic diagram of an apparatus according to various embodiments of the invention.

FIG. 1 is a schematic diagram of an apparatus 100 according to various embodiments of the invention. Some embodiments may include an apparatus 100 having one or more transformers T1 and T2 (e.g., mode transformers) to put power into the cable 110, which may include six conductors 1-6 (which may be substantially identical, perhaps substantially symmetrically arranged around a seventh conductor 7). In some embodiments, the seventh conductor 7 may comprise a central cable conductor. It should be noted that while the transformers T1, T2 are shown as two separate transformers, each with four secondaries, the transformers T1, T2 may also be combined into one physical transformer wound on a single core with eight secondaries connected as shown in FIG. 1. An eighth conductor (shown as armor 114) may also be included in the cable 110.

Cable 110 can be eight kilometers or more miles in length, and the electrical conductors 1-6 may be subject to strong capacitive and inductive coupling. As a consequence, signals sent downhole along any two arbitrary conductors may be subject to significant distortion due to crosstalk from signals on the other conductors. One solution to this problem is to use separate conductors for various signals, but this may be impractical since it may be the case that two conductors are needed for each function, offering a relatively high resistance path. Another solution to this problem may be the use of electrical combinations of conductors, or "eigenmodes" of symmetrically arranged conductors to cancel out the mutual coupling between various conductors due to their close proximity.

By transmitting signals over groupings of cable conductors having certain symmetries, many coupling effects can be greatly reduced. For the purposes of this document, it will be assumed that the conductors 1-6 in cable 110 are substantially equidistant from the center of adjacent conductors and from the center of the cable 110 (e.g., conductor 7, which may comprise a central conductor).

Seven conductor logging cables are routinely manufactured in which the electrical resistance of the six outer conductors and the capacitance between each of the conductors and the armor is within 1% of the minimum resistance value or the minimum capacitance value for the six conductors. For the independent transmission of several signals (using eigenmode techniques) to operate correctly, system symmetry should be carried through to the devices that couple energy into and out of the cable 110. Thus, eigenmode transformers may be of a special construction having multiple secondary windings. As shown in FIG. 1, transformer secondaries may be connected in series with certain cable conductors. Each transformer secondary winding may have the same number of turns N as all other windings or perhaps an integer multiple of the number of turns, n×N, where "n" is a positive integer 1, 2, etc. for a seven conductor cable.

TABLE I

| CONDUCTOR | MODE | | | | | |
|---|---|---|---|---|---|---|
| NUMBER | M1 | M2 | M3 | M4 | M5 | M6 |
| 1 | +1 | +1 | +1 | +1 | +1 | +1 |
| 2 | +1 | +1 | −1 | +1 | −1 | −1 |
| 3 | +1 | 0 | −2 | −2 | 0 | +1 |
| 4 | +1 | −1 | −1 | +1 | +1 | −1 |
| 5 | +1 | −1 | +1 | −1 | −1 | +1 |
| 6 | +1 | 0 | +2 | −2 | 0 | −1 |

Each of the columns in TABLE I represents an eigenvector corresponding to a signal and/or power transmission mode. In many cases, signals can be transmitted on each of the illustrated eigenmodes simultaneously over the same six cable conductors with minimal interference between the various signals. For a cable with six substantially symmetrically placed conductors there may be six independent eigenmodes e.g., modes 1-6. Each number (e.g., +2, 0, −1, etc.) in a particular column of table I represents the component of the eigenvector corresponding to the weight that a particular cable conductor should be excited to excite that mode. The relative values of the components of each eigenvector indicate the ratios of voltages that are impressed on (or currents induced in) each conductor in order to excite the particular signal or power transmission mode described mathematically by that eigenvector. That these sets of numbers describe orthogonal modes may be determined by taking the inner product of any two eigenvectors (multiplying the components of any one eigenvector by the corresponding components of any other eigenvector and taking the sum of these products). The inner product of two different orthogonal eigenvectors should equal zero, while the inner product of any eigenvector with itself should be non-zero.

Eigenmode transmission in multiconductor cables is treated by David F. Strawe in the Boeing Co. report number D2-19734-1 "Analysis of Uniform Symmetric Transmission Lines", Jan. 27, 1971, and in Boeing Co. report number D2-26245-1 "Analysis of the Controlled-Lay Conductor", January 1973. Additional information describing equipment using eigenmode transmission on a multiconductor cable can be found in "Multiconductor Transmission Line Analysis" by Sidnely Frankel, Artech House Inc., 1977, "Analysis of Multiconductor Transmission Lines" (Wiley Series in Microwave and Optical Engineering), by Clayton R. Paul, 1994, and in U.S. Pat. No. 6,469,636, issued to Baird, et al. These documents are hereby incorporated by reference herein in their entirety.

Because of the physical symmetry of the group of conductors chosen to carry currents of any particular mode, signals sent on one mode may provide minimal interference with signals sent on any other mode. Such signal independence can be desirable. For example, due to signal independence, 60 Hz and/or 400 Hz electrical power from the surface to downhole tools and bi-directional telemetry signals between the tools and the surface equipment can be simultaneously and successfully sent using just six outer conductors. Even large transient surges in power due to motors turning on and off may be rendered relatively invisible to other modes (e.g., those carrying sensitive telemetry information).

Mode independence is desirable to minimize signal interference, including crosstalk. In practice, the degree to which various voltage and current weightings are attained may directly affect the independence of the modes from each other. In order to maintain the selected ratios of voltages (or currents) along the length of a cable, the cable should have conductors that are well balanced. Here, "well balanced" means that each cable conductor should have substantially the same resistance per unit length, the same capacitance to armor per unit length, and a substantially uniform diameter and lay length over the length of the cable. In other words, the impedance and mutual coupling of the outer six conductors of the cable should be substantially matched. Operational amplifiers, capacitors, or transformers are examples of techniques which may be used to impress voltages (or currents) onto the various conductor conductors to excite a given mode. Of these, a special type of transformer has been found to be well suited to inducing and extracting signals of the weights selected. For the purposes of this document, a "mode transformer" includes any transformer constructed so as to be capable of implementing the functions described herein, including the multifilar transformers described hereinbelow.

Multifilar transformers may have substantially identical windings, that is, each winding has substantially the same characteristics, e.g. substantially the same number of turns, substantially the same capacitance with respect to adjacent windings, substantially the same self inductance, and substantially the same mutual inductance with respect to adjacent windings. Multifilar transformers with N identical secondary windings may be constructed by twisting N wires together, and then wrapping the twisted wire bundle together around the transformer core. To excite or receive a double voltage in a particular conductor (e.g. For conductors 3 and 6 in modes M3 and M4), two of these identical windings may be connected in series. An additional beneficial consequence of multifilar transformer design results from capacitive coupling between wires in the twisted wire bundle. This capacitive coupling may offset the self-inductance of the windings, thereby extending the effective bandwidth of multifilar transformers. For small signals (e.g. those used in communications and telemetry), the bandwidth may extend into the megahertz range.

For the purpose of simplicity, only one cable conduction mode will be used to illustrate the application discussed herein. Mode 6 is used for the purposes of illustration to show how power can be supplied to a motor, a motor driver, and other instrumentation downhole using a single DC power supply at the surface. Note that the positive terminal of the surface power supply 150 may be connected to cable conductors 1, 3, and 5, while the negative terminal of the surface supply may be connected to cable conductors 2, 4, and 6. These correspond to the weights called out in Table I to excite Mode 6 (i.e., conductor eigenmode M6). However, it should be noted that any one or more of six independent symmetrical conductor modes can be selected to provide power dissipation. For example, Conductor Mode 4 may be selected because it is not excited by power or telemetry transmission in certain systems. With mode 4 excitation, equal currents of magnitude I on cable conductors 1, 2, 4 and 5 exist in one direction. The electrical current returns in the opposite direction on conductors 3 and 6 with a magnitude 2×I. Current return on conductors 3 and 6 is possible since all six outer conductors are connected together at the surface through the low impedance of the power supply and the bypass capacitor C3. Transformer secondaries for the purposes of this discussion are those transformer windings connected in series with wireline conductors 1-6.

While only one transformer (e.g., transformer T1) may be used to effect the shunting functionality described herein, additional transformers may also be used (e.g., transformer T2). For example, two transformers T1 and T2 may be considered for a system that has two independent power and telemetry loops. Thus, one loop may include conductors 1, 3, and 5, and the other loop may include conductors 2, 4, and 6. In addition, while the primaries of transformers T1, T2 are shown connected in parallel, they may also be connected in series. Alternately, the windings of transformers T1, T2 may located on a single core so as to combine the transformers T1, T2 into a single physical transformer.

Shunt regulator activation may depend on a comparator U1, such as an amplifier, including an operational amplifier, to compare a reduced or divided portion of a bus voltage 118 (e.g., 200 VDC bus voltage) to a reference signal developed by a reference D1 (e.g., a zener diode, including a 2.1 VDC zener diode). For example, as shown, the division of the bus voltage 118 may be accomplished at the junction 122 of resistors R2 and R3, which may be selected to provide a voltage ratio of approximately 100:1. Thus, with about 200 VDC present as the bus voltage 118, the junction 122 of resistors R2 and R3 should be at about 2 VDC. Assuming a 2.1 VDC zener diode serves as the reference D1, whenever the bus voltage 118 increases above about 210 VDC, the junction 122 of resistors R2 and R3 should increase above about 2.1

VDC, causing the output 126 of the comparator U1 to become positive and turn on the switching element Q1 (e.g., a transistor, such as a field effect transistor, or one or more insulated gate bipolar transistors in parallel). The resistance of switching element Q1 should be low to reduce switching element Q1 power dissipation when the switching element Q1 turns on.

With the switching element Q1 turned on, current may be drawn through the primary windings of transformers T1 and T2. In order for the transformers to transfer power to the conductors 1-6 the current in the primary windings should change in a substantially continuous fashion. This may be accomplished in many ways, such as by making use of the conductor capacitance between conductors 1, 3, 5 and 2, 4, 6 (e.g., on the order of 1uF for a cable 110 about 7500 m long). When switching element Q1 is turned on, this capacitance can be connected in parallel with the self inductance of the transformer T1 and T2 primary windings. In this manner, the primary winding self inductance of transformers T1 and T2 and the conductor capacitance of conductors 1-6 may be used to form a resonant circuit, leading to oscillation, and a changing current that can induce energy transfer into the conductors 1-6.

Because the comparator U1 and the switching element Q1 may comprise relatively fast acting elements, there can be a tendency toward self oscillation when the supply voltage tends to increase above the firing voltage. Thus, with the voltage provided by the power supply 150 at the surface charging the logging line capacitance, the downhole voltage may tend to rise slowly, and be pulled down quickly by the relatively fast action of the comparator U1 and the switching element Q1. Such self oscillation may not be desirable because an uncontrolled oscillation frequency may interfere with telemetry signals being transmitted on other eigenmodes. For this reason it may be desirable to couple a resonant tank circuit in series with the mode transformer primaries so that selected components of the tank circuit operate to control the shunt regulator oscillation frequency at a value that does not interfere with telemetry frequencies.

Inductor L1 and capacitors C1 and C2, perhaps configured as a pi-filter, may be used to reduce or prevent operational oscillations from entering the various loads coupled to the cable 110, e.g., instrumentation INSTRUMENTS, load M1 (e.g., a motor) and controller 134, such as a motor controller for motor M2. The instrumentation INSTRUMENTS may include any number of components coupled to the conductors 1-6, including a wired or wireless data transmitter XMIT, as well as instruments which measure various properties of the earth in the vicinity of the borehole.

In some embodiments, one or more additional mode transformers can be connected in series with the cable conductors at the surface using the same mode connection as used downhole. Connections A-F may be used to couple the cable 110 directly to the surface power supply 150, or indirectly, using a control element 130. Thus, via the optional use of a control element 130, the secondary winding of surface transformers T3 and T4 may be connected in series with the cable conductors having the same mode symmetry as the secondary windings of the downhole transformers T1 and T2. Although shown as two separate transformers, T3 and T4 may be wound on the same core so as to comprise a single physical transformer.

The output windings (primary windings) of transformer pair T3 and T4 may be coupled in series and to the input of an amplifier U2, such as a high impedance amplifier. The polarity of the connection from the primary windings of transformers T3 and T4 to the inputs of amplifier U2 may be arranged so that when the switching element Q1 turns on, the output 138 of U2 is positive. Resistors R6 and R7 may be used to control the gain of amplifier U2. A diode D2 connected between T3 transformer primary winding and resistor R11 allows the oscillating current to flow in one direction only so that charge may accumulate on capacitor C3 connected between the junction of R11 and R6 and the primary winding of transformer T4. This average DC level proportional to the magnitude of the oscillation becomes the positive output of amplifier U2, Verror, which may act as a DC level opposing the set voltage Vset input to an amplifier U3 summing junction 142. Note that the set voltage Vset may be equal in magnitude to the desired surface voltage, but should be opposite in polarity if the amplifier U3 comprises an operational amplifier connected as an inverting summing amplifier.

The output 146 of amplifier U3 may be used to control the output level of the surface power supply 150. The ratio of resistors R8 and R10 (e.g., R8/R10) may be used to control the sensitivity with which amplifier U3 operates to amplify the error signal correction, Verror, compared to the set voltage Vset sensitivity, which may in turn be controlled by the ratio of resistors R9 and R10 (e.g., R9/R10). For example, the value of resistor R6 can be choosen to be 100 Kohms or greater so that the various loads connected to the surface primary windings of transformers T3 and T4 will be high. If such is the case, there may be little power extracted from the mode and the conductors involved will continue to dissipate most of the power (e.g., greater than about 50%) shunted away from the various loads (e.g., instrumentation INSTRUMENTS, load M1, and motor controller 134). The desired result is to maintain the bus voltage 118 at substantially the same value (e.g., about 200 VDC), even when load conditions change dramatically. In some embodiments, filtering may be used to further isolate motor noise from the instrumentation INSTRUMENTS power supply inputs.

Additional loads (e.g., an existing 100 VDC motor M2 deployed in a tool 154, such as a density tool or caliper) may receive power from the bus voltage 118, via controller 134, perhaps with the addition of optional transformers T5, T6, and T7. The transformers T5, T6, and T7 may operate to convert the bus voltage 118 (e.g. a 200 VDC signal) to a 100 VDC signal for example. Thus many embodiments may be realized.

For example, an apparatus 100 may include one or more transformers T1, T2, as well as one or more conductors 1-6 to couple to the primary windings of the transformers. The conductors 1-6 may be used to receive shunt current determined by an inductance associated with the transformers (e.g., self-inductance) and a capacitance associated with the conductors 1-6 according to a sensed component of power distributed by the conductors 1-6 through the transformers T1, T2. The sensed component of the power may comprise, for example, the bus voltage 118, a voltage supplied to the load M1, or derivatives of either, among others. The apparatus 100 may also include a load M1, such as a motor (e.g., a caliper motor, a coring tool motor, a tractor drive motor, and a pump drive motor, among others), to receive the power from the one or more of the transformers T1, T2.

In some embodiments, the apparatus 100 may include a switching element Q1 (e.g., one or more transistors) to enable conduction in the primary winding of the transformers T1, T2. The apparatus 100 may also include a comparator U1 to couple to the conductors 1-6 (e.g., directly, or indirectly, via transformers T1, T2) and to receive a signal derived from the sensed component of the power (e.g., the voltage provided by the junction 122). The signal derived from the sensed component of the power may comprise a voltage to be compared to a component of a preselected power supply voltage (e.g., the 200 VDC for the bus voltage 118), such as a scaled portion of a motor power supply voltage. The scaled portion of the motor power supply voltage may comprise the output of a reference D1. For example, using the exemplary voltages described herein, a zener diode reference voltage of about 2.1 VDC as a component of the 200 VDC bus voltage may be used. In some embodiments, the switching element Q1 may be used to couple to an output of the comparator U1 and to enable conduction in the primary windings of the transformers T1, T2.

Additional transformers, such as transformers T3, T4 may be included in the apparatus 100. In this case, the transformers T3, T4 may be used to couple to the conductors 1-6, such that the primary windings of the transformers T3, T4 are used to couple to an output level control 146 of a power supply 150 to provide power to the loads (e.g., instrumentation INSTRUMENTS, load M1, and controller 134). Further, the surface transformers T3, T4, coupled to conductors 1-6, may operate to distribute the power in a substantially symmetric manner with the downhole transformers T1, T2, according to a mode connection of the conductors 1-6. In some embodiments, one or more filters (e.g., the combination of capacitors C1, C2 and inductor LI) may be coupled to the primary winding of one or more of the transformers T1, T2 to filter oscillatory signals derived from the shunt current.

Figure 2A:
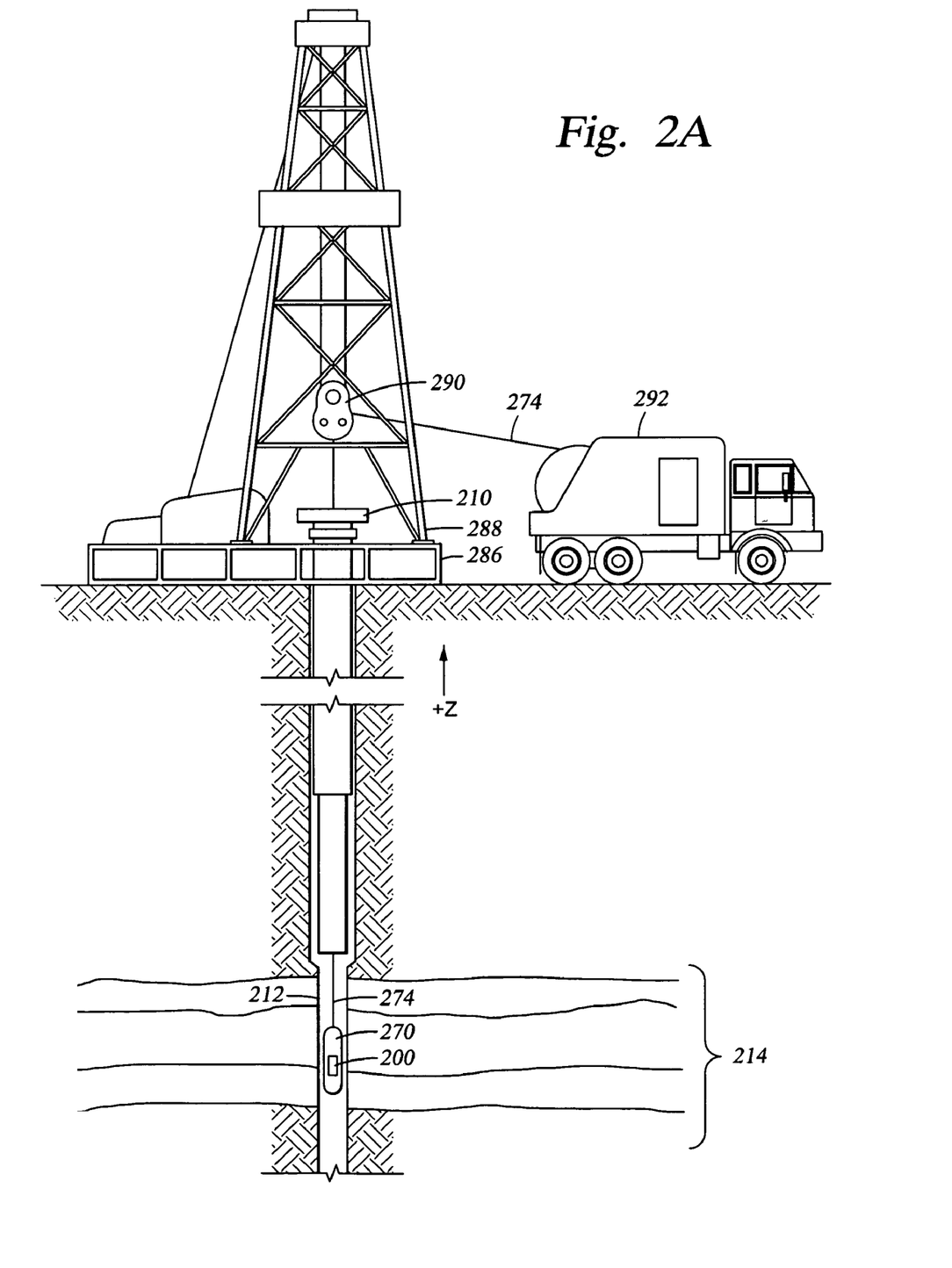
FIGS. 2A and 2B illustrate apparatus and systems according to various embodiments of the invention.
Figure 2B:
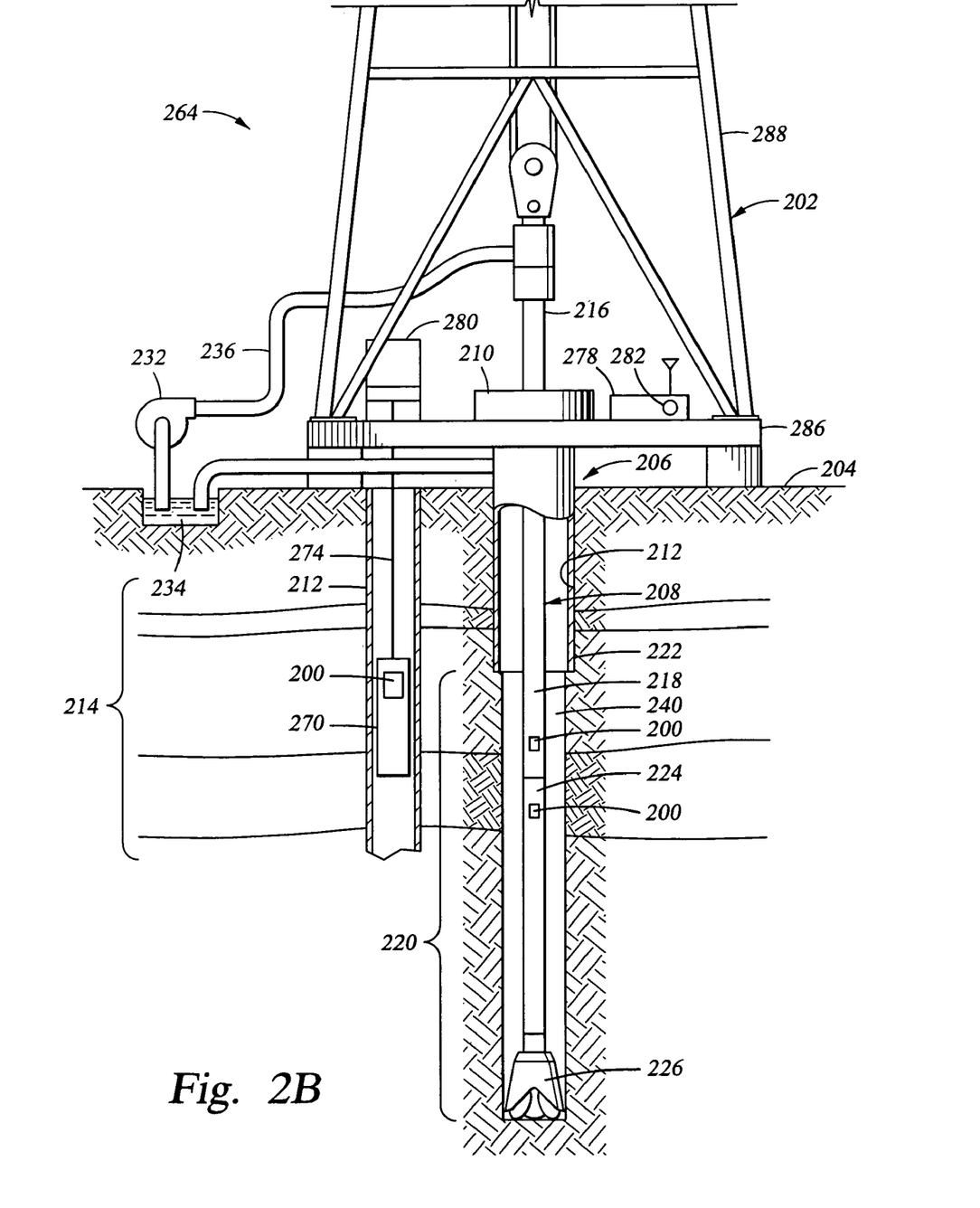

FIGS. 2A and 2B illustrate apparatus 200 and systems 264 according to various embodiments of the invention, which may comprise portions of a tool body 270 as part of a wireline logging operation, or of a downhole tool 224 as part of a downhole drilling operation. FIG. 2A shows a well during wireline logging operations. A drilling platform 286 is equipped with a derrick 288 that supports a hoist 290. Drilling of oil and gas wells is commonly carried out by a string of drill pipes connected together so as to form a drilling string that is lowered through a rotary table 210 into a wellbore or borehole 212. Here it is assumed that the drilling string has been temporarily removed from the borehole 212 to allow a wireline logging tool body 270, such as a probe or sonde, to be lowered by wireline or logging cable 274 into the borehole 212. Typically, the tool body 270 is lowered to the bottom of the region of interest and subsequently pulled upward at a substantially constant speed. During the upward trip, instruments included in the tool body 270 may be used to perform measurements on the subsurface formations 214 adjacent the borehole 212 as they pass by. The measurement data can be communicated to a logging facility 292 for storage, processing, and analysis. The logging facility 292 may be provided with electronic equipment for various types of signal processing. Similar log data may be gathered and analyzed during drilling operations (e.g., during Logging While Drilling, or LWD operations).

Turning now to FIG. 2B, it can be seen how a system 264 may also form a portion of a drilling rig 202 located at a surface 204 of a well 206. The drilling rig 202 may provide support for a drill string 208. The drill string 208 may operate to penetrate a rotary table 210 for drilling a borehole 212 through subsurface formations 214. The drill string 208 may include a Kelly 216, drill pipe 218, and a bottom hole assembly 220, perhaps located at the lower portion of the drill pipe 218.

The bottom hole assembly 220 may include drill collars 222, a downhole tool 224, and a drill bit 226. The drill bit 226 may operate to create a borehole 212 by penetrating the surface 204 and subsurface formations 214. The downhole tool 224 may comprise any of a number of different types of tools including MWD (measurement while drilling) tools, LWD (logging while drilling) tools, and others.

During drilling operations, the drill string 208 (perhaps including the Kelly 216, the drill pipe 218, and the bottom hole assembly 220) may be rotated by the rotary table 210. In addition to, or alternatively, the bottom hole assembly 220 may also be rotated by a motor (e.g., a mud motor) that is located downhole. The drill collars 222 may be used to add weight to the drill bit 226. The drill collars 222 also may stiffen the bottom hole assembly 220 to allow the bottom hole assembly 220 to transfer the added weight to the drill bit 226, and in turn, assist the drill bit 226 in penetrating the surface 204 and subsurface formations 214.

During drilling operations, a mud pump 232 may pump drilling fluid (sometimes known by those of skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 212. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 214 cuttings created by operating the drill bit 226.

Thus, referring now to FIGS. 1, 2A, and 2B, it may be seen that in some embodiments, the system 264 may include a drill collar 222, a downhole tool 224, and/or a wireline logging tool body 270 to house one or more apparatus 200, similar to or identical to the apparatus 100 described above and illustrated in FIG. 1. Thus, for the purposes of this document, the term "housing" may include any one or more of a drill collar 222, a downhole tool 224, and a wireline logging tool body 270. The downhole tool 224 may comprise an LWD tool or MWD tool. The tool body 270 may comprise a wireline logging tool, including a probe or sonde, for example, coupled to a logging cable 274, similar to or identical to the cable 110 of FIG. 1.

The conductors 1-6; apparatus 100, 200; cables 110, 274; bus voltage 118; junction 122; outputs 126, 138, 146; control element 130; controller 134; summing junction 142; power supply 150; motor M2; tool 154; drilling rig 202; surface 204; well 206; drill string 208; rotary table 210; borehole 212; subsurface formations 214; Kelly 216; drill pipe 218; bottom hole assembly 220; drill collars 222; downhole tool 224; drill bit 226; mud pump 232; mud pit 234; hose 236; annular area 240; system 264; tool body 270; logging cable 274; platform 286; derrick 288; hoist 290; logging facility 292; connections A-F; capacitors C1, C2; reference D1; instrumentation INSTRUMENTS; inductor L1; load M1; switching element Q1; resistors R2, R3, R6, R7, R8, R9, R10; transformers T1, T2, T3, T4, T5, T6, T7; comparator U1; amplifiers U2, U3; voltages Vset, Verror; and data transmitter XMIT may all be characterized as "modules" herein. Such modules may include hardware circuitry, and/or a processor and/or memory circuits, software program modules and objects, and/or firmware, and combinations thereof, as desired by the architect of the apparatus 100, 200 and systems 264, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling and logging operations, and thus, various embodiments are not to be so limited. The illustrations of apparatus 100, 200 and systems 264 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, personal computers, workstations, vehicles, and conducting cables for a variety of electrical devices, among others. Some embodiments include a number of methods.

Figure 3:
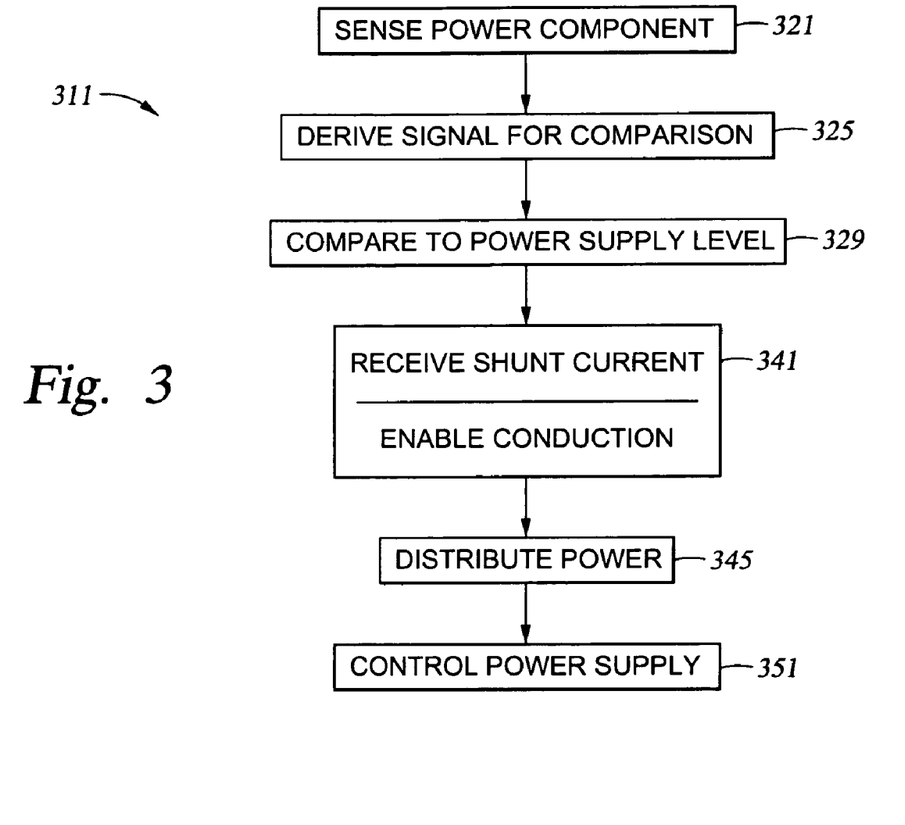
FIG. 3 is a flow chart illustrating several methods according to various embodiments of the invention.

For example, FIG. 3 is a flow chart illustrating several methods 311 according to various embodiments of the invention. In some embodiments of the invention, a method 311 may (optionally) begin at block 321 with sensing a sensed component of power (e.g., a current or voltage) distributed by a conductor through a transformer, perhaps realized as sensing the sensed component as a voltage across a motor. The method 311 may include deriving an appropriate signal (e.g., a voltage) from the sensed component of the power to compare to a preselected power supply level, such as a preselected power supply voltage or current, at block 325. The method 311 may continue with comparing the sensed component (or the signal derived from the sensed component) to the preselected power supply level, including a preselected power supply voltage or current, at block 329.

In some embodiments, the method 311 may include receiving shunt current in the conductor according to the sensed component of power distributed by the conductor through a transformer coupled to the conductor, as determined by an inductance associated with the transformer and a capacitance associated with the conductor, at block 341. To receive the shunt current at block 341, the method 311 may include enabling conduction in a primary winding of the transformer responsive to sensing an indication, derived from the sensed component, of a voltage greater than a preselected power supply voltage, for example. It should be noted that while the actions described with respect to the method 311 are noted with respect to a single conductor and transformer, multiple conductors and/or transformers may also be used, as described in previous portions of this document.

For example, in some embodiments, the method 311 may include distributing the power in a substantially symmetric manner between a first transformer (e.g., the transformer coupled to the conductor transmitting the sensed component of power) and a second transformer according to a mode connection of the conductor (e.g., Cable Mode 4, among others) at block 345. The method 311 may (optionally) conclude with controlling an output level control of a power supply to provide the power using a primary winding of the second transformer coupled to the conductor at block 351.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 4:
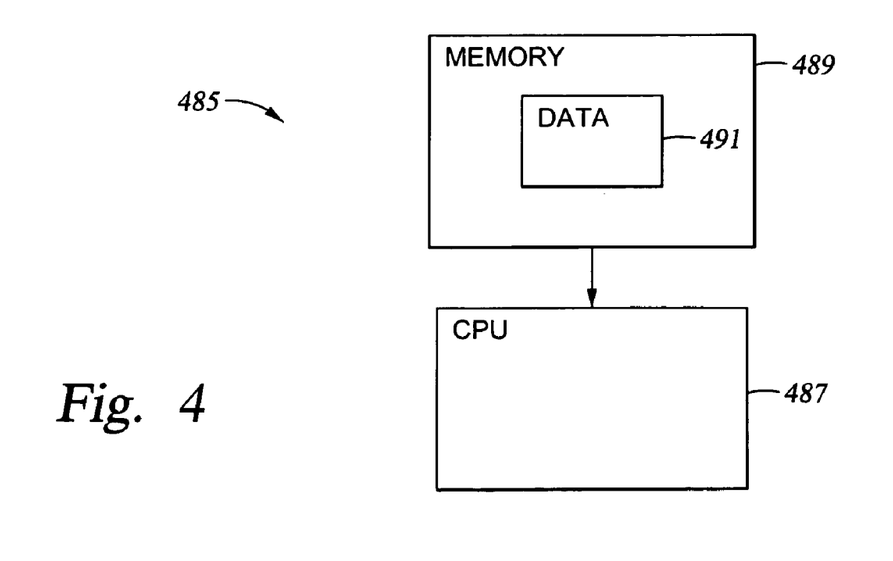
FIG. 4 is a block diagram of an article according to various embodiments of the invention.

For example, FIG. 4 is a block diagram of an article 485 according to various embodiments, such as a computer, a memory system, a magnetic or optical disk, some other storage device, and/or any type of electronic device or system. The article 485 may include a processor 487 coupled to a machine-accessible medium such as a memory 489 (e.g., removable storage media, as well as any memory including an electrical, optical, or electromagnetic conductor) having associated information 491 (e.g., computer program instructions and/or data), which when accessed, results in a machine (e.g., the processor 487) performing such actions as receiving shunt current in one or more conductors according to a sensed component of power distributed by the conductor(s) through one or more transformer(s) coupled to the conductor(s). The shunt current may be determined by an inductance associated with the transformer(s) and a capacitance associated with the conductor(s).

Other actions may include sensing the sensed component as a voltage across a motor, and comparing the sensed component to a preselected power supply level, such as a power supply voltage or current. Further actions may include enabling conduction in a primary winding of the transformer responsive to sensing an indication, derived from the sensed component, of a voltage greater than a preselected power supply voltage, for example. Additional actions may include controlling an output level control of a power supply to provide the power using a primary winding of a second transformer coupled to the conductor.

Using the apparatus, systems, and methods disclosed herein may permit using a single surface power source to supply multiple down-hole components: instruments, and a variety of motors, such as 200 VDC motors. Such an implementation may also obviate the use of multiple surface power transformers.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a motor positioned downhole;
   a first transformer having a primary winding coupled to power input of the motor; and
   a downhole logging line cable to couple to the primary winding of the first transformer to receive shunt current determined by an inductance associated with the first transformer and a capacitance associated with the downhole logging line cable according to a sensed component of power distributed by the downhole logging line cable through the first transformer, wherein the shunt current is received as part of power dissipation from power that is in excess of power required to operate the motor, wherein the shunt current into the primary winding of the first transformer is to dissipate the excess of power into the downhole logging cable.

2. The apparatus of claim 1, wherein the motor is selected from one of a caliper motor, a coring tool motor, a pump drive motor, or a tractor drive motor.

3. The apparatus of claim 1, wherein the sensed component of the power comprises a voltage supplied to a motor.

4. The apparatus of claim 1, further comprising:
   a switching element to enable conduction in the primary winding of the first transformer.

5. The apparatus of claim 4, wherein the switching element comprises at least one transistor.

6. The apparatus of claim 1, further comprising:
   a comparator to couple to the downhole logging line cable and to receive a signal derived from the sensed component of the power.

7. The apparatus of claim 6, wherein the signal derived from the sensed component of the power is a voltage to be compared to a preselected voltage.

8. The apparatus of claim 6, further comprising:
   a switching element to couple to an output of the comparator and to enable conduction in the primary winding of the first transformer.

9. The apparatus of claim 1, further comprising:
   a second transformer to couple to the downhole logging line cable, wherein a primary winding of the second transformer is to couple to an output level control of a power supply to provide the power.

10. The apparatus of claim 1, further comprising:
    a second transformer to couple to the downhole logging line cable and to distribute the power in a substantially symmetric manner with the first transformer according to a mode connection of the downhole logging line cable.

11. The apparatus of claim 1, further comprising:
    a filter to couple to the primary winding of the first transformer and to filter oscillatory signals derived from the shunt current.

12. A system, comprising:
    a tool body;
    a motor positioned downhole;
    a first transformer included in the tool body, the first transform having a primary winding coupled to power input of the motor; and
    a downhole logging line cable to couple to the primary winding of the first transformer to receive shunt current determined by an inductance associated with the first transformer and a capacitance associated with the downhole logging line cable according to a sensed component of power distributed by the downhole logging line cable through the first transformer, wherein the shunt current is received as part of power dissipation from power that is in excess of power required to operate the motor, wherein the shunt current into the primary winding of the first transformer is to dissipate the excess of power into the downhole logging cable.

13. The system of claim 12, wherein the motor is selected from one of a caliper motor, a coring tool motor, a pump drive motor, or a tractor drive motor.

14. The system of claim 12, wherein the sensed component of the power comprises a voltage supplied to a motor.

15. The system of claim 12, further comprising:
    a switching element to enable conduction in the primary winding of the first transformer.

16. The system of claim 15, wherein the switching element comprises at least one transistor.

17. The system of claim 12, further comprising:
    a comparator to couple to the downhole logging line cable and to receive a signal derived from the sensed component of the power.

18. The system of claim 17, wherein the signal derived from the sensed component of power is a voltage to be compared to a preselected voltage.

19. The system of claim 17, further comprising:
    a switching element to couple to an output of the comparator and to enable conduction in the primary winding of the first transformer.

20. The system of claim 12, further comprising:
    a second transformer to couple to the downhole logging line cable, wherein a primary winding of the second transformer is to couple to an output level control of a power supply to provide the power.

21. The system of claim 12, further comprising:
    a second transformer to couple to the downhole logging line cable and to distribute the power in a substantially symmetric manner with the first transformer according to a mode connection of the downhole logging line cable.

22. The system of claim 12, further comprising:

a filter to couple to the primary winding of the first transformer and to filter oscillatory signals derived from the shunt current.

23. The system of claim 12, further comprising:

a data transmitter coupled to the downhole logging line cable.

24. A method, comprising:

receiving shunt current in a drill string, to dissipate power that is excess of power required to operate a motor downhole, according to a sensed component of power distributed by the drill string through a transformer coupled to the drill string and determined by an inductance associated with the transformer and a capacitance associated with the drill string, wherein the excess of power is dissipated into the drill string.

25. The method of claim 24, further comprising:

comparing the sensed component to a preselected level.

26. The method of claim 24, further comprising:

enabling conduction in a primary winding of the transformer responsive to sensing an indication, derived from the sensed component, of a voltage greater than a preselected voltage.

27. The method of claim 24, further comprising:

deriving a signal from the sensed component of the power to compare to a preselected level.

28. The method of claim 24, further comprising:

controlling an output level control of a power supply to provide the power using a primary winding of a second transformer coupled to the drill string.

29. The method of claim 24, further comprising:

distributing the power in a substantially symmetric manner between the first transformer and a second transformer according to a mode connection of the drill string.

30. An article including a machine-accessible medium having associated information, wherein the information, when accessed, results in a machine performing:

receiving shunt current in a downhole logging line cable, to dissipate power that is excess of power required to operate a motor downhole, according to a sensed component of power distributed by the downhole logging line cable through a transformer coupled to the downhole logging line cable and determined by an inductance associated with the transformer and a capacitance associated with the downhole logging line cable, wherein the excess of power is dissipated into the downhole logging line cable.

31. The article of claim 30, wherein the information, when accessed, results in the machine performing:

sensing the sensed component as a voltage across the motor.

32. The article of claim 30, wherein the information, when accessed, results in the machine performing:

comparing the sensed component to a preselected power supply level.

33. The article of claim 30, wherein the information, when accessed, results in the machine performing:

enabling conduction in a primary winding of the transformer responsive to sensing an indication, derived from the sensed component, of a voltage greater than a preselected power supply voltage.

34. The article of claim 30, wherein the information, when accessed, results in the machine performing:

controlling an output level control of a power supply to provide the power using a primary winding of a second transformer coupled to the downhole logging line cable.

* * * * *